United States Patent Office 3,684,521
Patented Aug. 15, 1972

3,684,521
METHOD OF MAKING AN EXTRUDED
EXPANDED PROTEIN PRODUCT
Martin Glicksman, 229 Valley Road, Valley Cottage, N.Y. 10989; Robert E. Klose, 9 Brookhill Drive, West Nyack, N.Y. 10994; and Richard D. Kirkeby, 82 Hudson Ave., Irvington, N.Y. 10533
No Drawing. Filed Feb. 9, 1970, Ser. No. 10,020
Int. Cl. A23j 1/14
U.S. Cl. 99—17
4 Claims

ABSTRACT OF THE DISCLOSURE

An expanded protein material for food use is made by preparing a mix containing a proteinaceous material, water and magnesium oxide and/or calcium oxide, wherein the mix is subjected to elevated temperature and pressure followed by a sudden release of pressure to expand the proteinaceous mixture.

BACKGROUND OF THE INVENTION

The present invention deals with the formation of expanded protein material having an open, cellular structure which is ultimately used in food products, both for animal and human consumption. The disclosed process deals with utilizing a protein source of material, water, and expanding agent such as magnesium oxide and/or calcium oxide. These source materials are mechanically mixed at high temperature and high pressure and extruded to a zone of lower temperature and lower pressure to form an expanded protein product.

Much development has been undertaken in recent years to form expanded proteinaceous-containing materials suitable as a food source. For example, proteinaceous materials are formulated as meat analogs with a resulting saving of costs over their meat counterparts. Significant developments have been directed toward use of protein derived from fish and vegetable materials such as soybeans, peanuts, cottonseed and the like.

British patent, specification 1,049,848, complete specification published Nov. 30, 1966, is directed to the formation of an expanded protein-containing product of plexilamellar structure which is characterized by an open cell structure wherein a majority of cells have a length to diameter ratio greater than 1, the length being measured in the direction of extrusion and the diameter being measured in the transverse direction. This product is formed by admixing a protein-containing raw material with water, masticating the mixture until uniformity is obtained and subjecting the mixture to a pressure of at least 100 p.s.i. and preferably greater than 1,000 p.s.i., while heating to a temperature within a range of 200° F. to form the expanded product. Various additives may be blended into the source protein mix, such as sodium chloride, calcium chloride, as well as flavoring and coloring additives.

British aptent, specification 1,105,904, complete specification published Mar. 13, 1968, is directed to the formation of a meat-like protein product, formulated by mixing together water and soybean meal, with a low fat content, heating and applying pressure to the mixture and extruding to a zone of a lower pressure. This British specification teaches that the pH of the mixture is between 0 and 14 before extrusion. However, it is taught that a pH between 4 and 8 is more desirable with an optimum pH between 7.5 and 8.0.

Australian patent specification No. 15,030/66, opened to public inspection on June 13, 1969 concerns itself with the formation of fibrous porous food products from a protein-containing vegetable material. This protein material is initially moistened, mechanically worked under elevated pressure and temperature, and extruded through a restricted orifice causing expansion of the material. The specification teaches that addition of a minute amount of sulphur to the material prior to extrusion causes beneficial results. Named sulphur additives include: elemental sulphur; potassium sulphide; and sodium sulphide.

The present invention is considered an improvement over the prior art teachings in that small amounts of additive namely, magnesium oxide and/or calcium oxide greatly increase the amount of expansion in the protein-containing material that do not contain expansion additives other than the necessary water. However, the most important advantage in the present invention is the improvement in flavor qualities in the product. If a sulfur-containing expanding material is employed, an undesirable sulfur flavor is introduced in the expanded protein. In contrast, the expanding agents of the present invention yield a bland product, free of undesirable flavors.

SUMMARY OF THE INVENTION

The present invention concerns an expanded protein material that has wide utility in the food field. For example, the present product may be formulated to have a meat-like texture and appearance. The expanded protein material is capable of absorbing many times its weight in liquid, hence, it serves as an ideal component in various food products, including main course dishes and convenience foods. Additionally, this material may serve in pet foods. The expanded material may be formulated such that a crisp, crunchy texture is obtained so that it may serve in a large variety of products such as snack food.

As set forth previously, the advantage of the present invention lies in its great amount of expansion. The protein food product of the present invention has a substantially greater amount of expansion than the expanded product of prior art literature without an expanding agent other than water. As will be more fully shown below, the expanding agents, magnesium oxide, and calcium oxide, yield a product that is more desirable since its flavor is blander and it does not have sulfur-type overtones as that of the prior art. The expanded protein product is made by using a source of proteinaceous material, water and the added expanding agent. The source materials are mixed under elevated temperature and pressure and discharged by extrusion to a zone of lower temperature and pressure. The degree of heating should lie above a temperature of about 220° F. prior to the extrusion operation. The amount of pressure that must be employed may be varied greatly, but preferably a pressure above 100 p.s.i. should be used.

The amount of expansion of the protein product will depend upon the variables in the process: the particular protein source material employed, the amount of water in the mix, the percentage of additive expanding agent employed, and the pressure and temperature and amount of work done in the extruder as well as the pressure and temperature drop across the extruder orifice. However, these variables may be easily controlled to obtain the desired amount of expansion desired specific to the necessary food utility.

DETAILED DESCRIPTION OF THE INVENTION

Expanded protein food product is made by utilizing a source of material containing protein, water and an added agent from the group consisting of magnesium oxide and calcium oxide. Source materials are heated to an elevated temperature and mechanically worked at elevated pressure followed by suddenly releasing the pressure to allow the material to expand. The composition may be premixed prior to being subjected to elevated temperature and pressure or the components may be separately metered and mixed under elevated temperature and pressure conditions before the sudden pressure release. The reason the magnesium oxide and/or calcium oxide expands the proteinaceous product is not directly understood. It is known that some water in the protein source material vaporizes and causes the mixture to expand upon the sudden release of pressure. However, it is not directly known why the addition of the added magnesium oxide or calcium oxide material causes the expansion of the protein product. However, it is thought that a combination of mechanical-chemical effect is obtained through the use of these agents.

The source of protein material can be derived from various food materials. The proteinaceous component preferably contains protein at least about 30% by weight of the dry material. This minimum level of protein is necessary to obtain the desired result of a greater expansion of the protein material. No upper limit of protein is necessary although in some cases, alignment rather than expansion becomes more evident. The protein material used in this invention may be from any conventional protein source, such as those derived from vegetables, meat, fish, milk and egg, as well as mixtures of these materials. Vegetable source of protein examples are soybeans, peanuts, cottonseed and sesame seeds. These sources of material may be in any conventional physical form such as ground flour or meal, pellets, bits or grits.

The amount of water that is added to the source protein material should be such that a moisture content of from about 15 to 50% by weight of the mix is obtained. Use of water below this percentage does not allow the desired amount of expansion. An excessive moisture content similarly interferes with the expansion desired in the present invention. However, some expansion outside this water percentage range nevertheless will take place.

The addition of the expanding material other than water namely, the magnesium oxide and calcium oxide in the present invention is added in small quantities. The percentage of magnesium oxide and/or cacluim oxide on a dry basis preferably should be less than 2%. The minimum content of these materials on a dry basis should be above 0.05% to obtain an appreciable increase and expansion effect from their addition. The preferred percentage of the magnesium oxide and/or calcium oxide is between 0.2% and 0.6% (dry basis) for optimum expansion.

When the terms magnesium oxide or calcium oxide are herein employed, the terms are used to include additionally the corresponding hydroxide of either magnesium or calcium.

The temperature in which the source material is raised during mechanical mixing is above the boiling point of water and preferably above 220° F. However, obviously, if the extrudate is obtained in a zone at pressures below atmospheric lower vaporization or flash temperatures may be employed. Thus, temperatures below the atmospheric boiling point of water may be employed if vacuum conditions are employed at the extrudate outlet such as temperature as low as 190° F. The upper temperature limit is determined by the amount of degradation the proteinaceous material or additive material may undergo so that the product will be suitable for the intended food use. Temperatures as high as about 475° F. may be tolerated for short time periods. A preferred range of temperature is about 220° F. to 400° F., and more preferably about 250° F. to 370° F.

The pressures employed during the mechanical mixing may be varied within rather wide ranges. The critical feature involving pressure is that a sudden release of pressure be obtained. Illustrative of pressures that may be employed are pressures in the range of 100 p.s.i. to 300 p.s.i. However, much higher pressures may be employed to obtain the desired expansion of the proteinaceous material. The upper limit of pressure will be determined to some extent by the type of apparatus employed.

Various other additives may be added that are nonproteinaceous in nature. These additives merely modify the characteristics of the dried final product, but do not interfere with the desirable expansion that is obtained. Such additives including flavors, colors, etc., would be well known to one in the food field, dependent on the specific food use of the protein-containing product. However, one additive that must not be present in great quantities is fat since it will interfere with the expansion of the proteinaceous material due to its lubricating effect upon the other materials. Accordingly, the level of fat should be kept below about 8 to 10% by weight of the proteinaceous material.

The preferred apparatus employed to obtain the extruded product is an extruder wherein the source materials are blended or separately added to the inlet of the extruder and subjected to mechanical force and shear by a screw which forces the source materials to a zone of higher pressure. It has been found that neither elevated temperature alone, nor elevated pressure is sufficient to bring about the desired expansion. Accordingly, both elevated temperature and elevated pressure are necessary in combination with one another to bring about the expansion of extrudate. Additionally, it has been found that a sudden release of pressure is necessary to allow expansion of protein material from the included water and the additional magnesium oxide and/or calcium oxide component.

The size of the die opening in the extruder can be varied depending on the degree of expansion desired to be achieved as well as the size of the product that is to be obtained. Also, a plurality of the openings may be employed. Modifications in the design of the particular apparatus to bring about the mechanical working at elevated temperature and elevated pressure followed by a sudden release of pressure will be obvious to one ordinarily skilled in the art. For example, the design of the screw may be modified so that the amount of mechanical work and/or shear may be varied per unit length of apparatus or per unit time interval. Also, a ram rather than a screw may be employed. However, the specific apparatus emloyed does not make any part of this invention.

The following examples illustrate more fully the inventive aspects of the expanded protein product.

Example 1

A mix containing 99.8% by weight of soy grits and 0.2% magnesium oxide was blended until homogeneous. The mix was continuously metered into a Wenger Model X–25 Extruder at a rate of 300 lbs. per hour along with a stream of water. The water and the soy grits-magnesium oxide were thoroughly mixed in the extruder. The amount of water was 25%. Steam pressure in the extruder jacket was 50 p.s.i.g. Two ⅜" diameter dies were used. Screw speed was 340 r.p.m. The temperature recorded at the die face during extrusion was 295° F. and the pressure was 120 p.s.i.g. The extruded product was dried to less than 10% moisture by an air stream at 250° F. The pH of a 2% water slurry of this material was 7.3. The density was 0.40 g./ml.

Example 2

This example is similar to Example 1, except that the composition of the mix was 99.4% soy grits and 0.6% magnesium oxide. Feed rate of the mixture into the extruder was 300 lbs./hr. and the amount of water 20%. Temperature recorded at the die face was 290° F. and the pressure 120 p.s.i.g. After drying to less than 10% moisture, the product had a density of 0.22 g./ml. and the pH of a 2% water slurry was 8.7.

Example 3

This example is similar to Example 1, except that the composition of the mix was 99.8% soy grits and 0.2% calcium oxide. Feed rate of this mixture into the extruder was 300 lbs./hr. and the amount of water added was 25%. The temperature recorded at the die face was 290° F. and the pressure was 100 p.s.i.g. After drying to below 10% moisture the product had a density of 0.40 g./ml. and the pH of a 2% water slurry was 7.3.

Example 4

This example is similar to Example 1, except that the composition of the mix was 99.4% soy grits and 0.6% calcium oxide. The feed rate of this mixture was 300 lbs./hr. and sufficient water was added to bring the moisture content of the mix to 20%. Temperature recorded at the die face was 280° F. and the pressure was 180 p.s.i.g. After drying to below 10% moisture, the product had a density of 0.38 g./ml. and the pH of a 2% water slurry was 7.7.

Example 5

This example is similar to Example 1, except that the composition of the sample was 99.4% soy grits and 0.6% calcium hydroxide. The feed rate of this mixture into the extruder was 250 lbs./hr. and sufficient water was added to bring the moisture content of the mixture to 20%. Temperature recorded at the die face was 340° F. and the pressure was 300 p.s.i.g. After drying to below 10% moisture, the product had a density of 0.32 g./ml. and the pH of a 2% water slurry was 7.3.

Examples 6 to 14

A control was made to show the expansion densities of proteinaceous materials at various process variables, but without the addition of the magnesium oxide and calcium oxide. A course of soy grits was blended with water into a Model X–25 Wenger Extruder. Steam pressure in the extruder jacket was 50 p.s.i.g. A screw speed of 340 r.p.m. was employed. The water-soy grits mixture was extruded through two ⅜" dies into room atmospheric pressure. The variables introduced into the nine control runs were:

(1) the dry soy feed rate,
(2) the percentage water in the mix,
(3) the pressure recorded at the die face, and
(4) the temperature recorded at the die face.

The first two variables, the dry soy feed rate and percent water in the mix were directly controlled in the heated extruder. These two initial variables controlled the pressure and temperature at the die face which pressure and temperature were recorded.

The product was dried to below 10% moisture by an air steam at 250° F. From the data of the nine control runs set forth below, it was found that the density of the runs yielded a product in all cases of substantially greater density than the expanded product of this invention. An average density of the product in the nine control runs was 0.751 grams/ml.

The variables in the nine control runs were:

| Dry soy feed rate | (lb./hr.) | Water level (percent) | Pressure (p.s.i.g.) | Temp. (°F.) | pH | Density (grams/ml.) |
|---|---|---|---|---|---|---|
| 6 | 250 | 20 | 175 | 265 | 7.2 | 0.907 |
| 7 | 250 | 25 | 110 | 285 | 6.1 | 0.613 |
| 8 | 250 | 30 | 25 | 298 | 7.2 | 0.614 |
| 9 | 300 | 20 | 130 | 295 | 7.2 | 0.719 |
| 10 | 300 | 25 | 175 | 240 | 7.6 | 0.747 |
| 11 | 300 | 30 | 50 | 275 | 7.3 | 0.909 |
| 12 | 350 | 20 | 195 | 280 | 7.5 | 0.806 |
| 13 | 350 | 25 | 120 | 275 | 7.1 | 0.582 |
| 14 | 350 | 30 | 100 | 295 | 6.9 | 0.862 |

The above examples are illustrative of the process parameters that may be employed to form the novel proteinaceous product that is expanded in this invention. However, various modifications in the process parameters and the process equipment will be obvious to those skilled in the art, therefore it is not intended to limit the scope to the present invention to the specific embodiments shown above.

What is claimed is:

1. A method of preparing an expanded protein product suitable for food use, having an open, cellular expanded structure comprising preparing a mixture consisting essentially a protein-containing material having a protein content of at least about 30% on a dry basis, an expanding agent selected from the group consisting of magnesium oxide, calcium oxide or mixtures thereof in the amount of above .05% to less than 2% of the protein-containing material on a dry basis and water in the amount of 15% to 50% by weight of the mixture; heating the mixture to a temperature above the boiling point of water; mechanically working the heated mixture to a pressure substantially above atmospheric pressure; and expanding the mixture by suddenly releasing the pressure.

2. The method of claim 1 wherein the mix is processed through an extruder; the mix being subjected to mechanical working as it is moved from the inlet to the discharge of the extruder; the pressure in said extruder being substantially above atmospheric pressure; the pressure on the mix being released as it is forced through a die head at the discharge end of the extruder into an atmospheric pressure zone.

3. The method of claim 1 wherein said expanding agent is magnesium oxide and is present in an amount between 0.2% and 0.6%.

4. The method of claim 1 wherein said expanding agent is calcium oxide and is present in an amount between 0.2% and 0.6%.

References Cited

UNITED STATES PATENTS 3,488,770    1/1970    Atkinson _____ 99—17

A. LOUIS MONACELL, Primary Examiner

W. A. SIMONS, Assistant Examiner

UNITED STATES PATENT OFFICE
CERTIFICATE OF CORRECTION

Patent No. 3,684,521          Dated Aug. 15, 1972

Inventor(s) Martin Glicksman, et al

It is certified that error appears in the above-identified patent and that said Letters Patent are hereby corrected as shown below:

In Column 1, Line 7 after "10533" and before "No Drawing." insert ---assignors to General Foods Corporation, White Plains, N.Y.---.
In Column 1, Line 58 change "aptent" to ---patent---.
In Column 3, Line 11 delete "agents.".
In Column 6, Line 23 (claim 1) after "essentially" and before "a" insert ---of---.

Signed and sealed this 8th day of May 1973.

(SEAL)
Attest:

EDWARD M. FLETCHER, JR.            ROBERT GOTTSCHALK
Attesting Officer                  Commissioner of Patents